Nov. 26, 1957     I. ELLIOTT     2,814,246
APPARATUS FOR PRODUCING DEEP FRIED BAKERY PRODUCTS
Filed Nov. 17, 1953
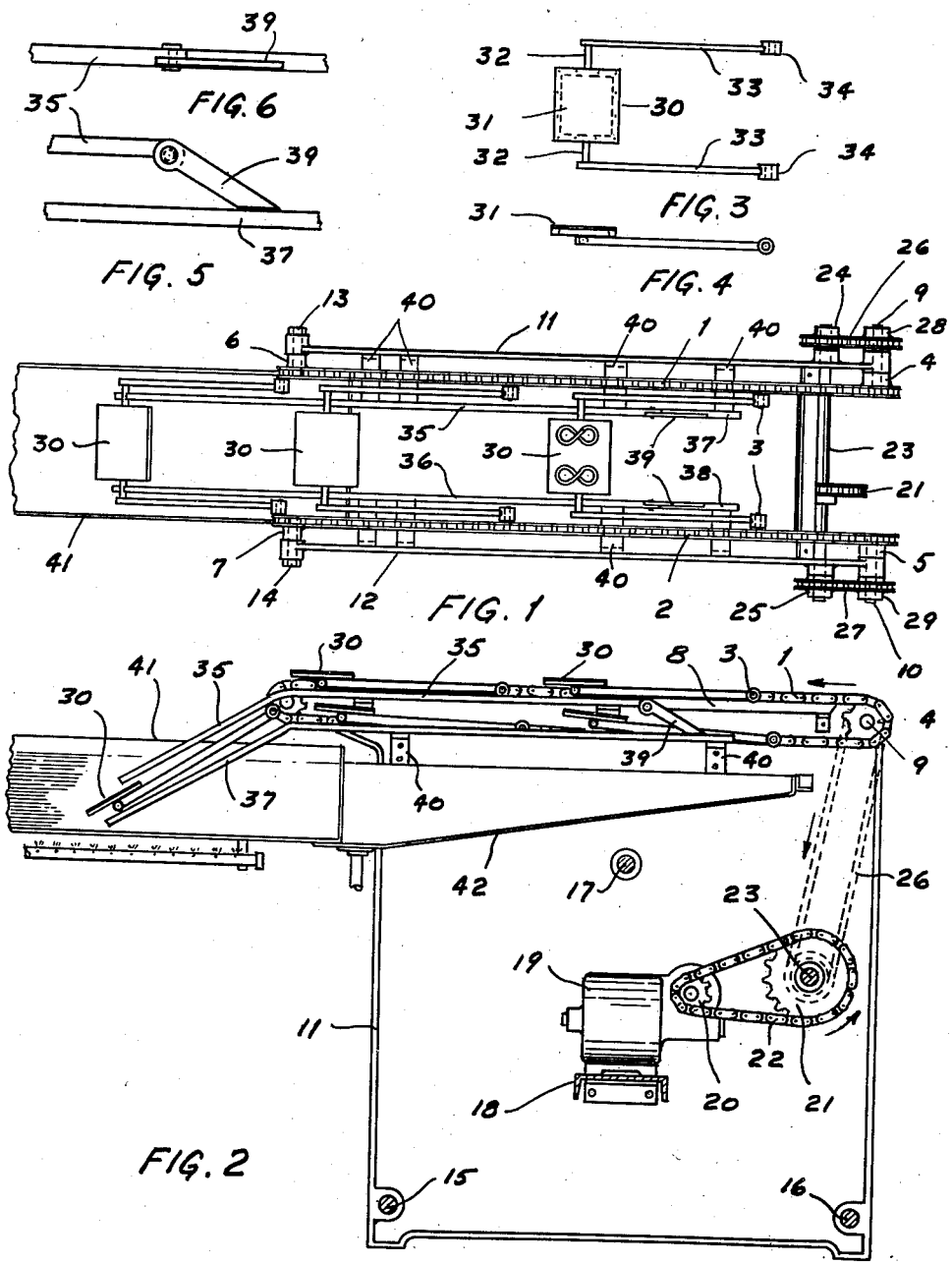
Irwin Elliott INVENTOR.

United States Patent Office 2,814,246
Patented Nov. 26, 1957

2,814,246

APPARATUS FOR PRODUCING DEEP FRIED BAKERY PRODUCTS

Irwin Elliott, Croton-on-Hudson, N. Y.

Application November 17, 1953, Serial No. 392,581

5 Claims. (Cl. 99—407)

This invention relates to novel and improved apparatus for producing deep fried bakery products.

The object of the invention is to provide means for deep frying numerous types of cake batters and doughs which cannot be used with present equipment and methods.

A further object is to provide means for producing fried products in a large variety of shapes or forms.

Fried products such as doughnuts and crullers are at present produced by two methods.

Cake doughnuts are dropped directly into the cooking oil from a depositing machine.

Yeast raised doughnuts and crullers are placed on screens and lowered into the cooking oil.

Both methods have definite limitations as to the type of batter or dough used and the shape of the finished product.

Mechanical operation limits the cake doughnut depositor to the common ring shaped piece, also to a fixed consistency of the batter itself.

Goods which are placed on a screen must be firm and sufficiently dry to rest on the screen surface without adhering to the screen wires. This fact limits such products to a firm non-sticky dough.

Numerous kinds of cake batters which produce more delicate and tasty products than the conventional doughnut or cruller can be deep fried but for the above limitations in present equipment and methods.

With my apparatus any batter suitable for deep frying which can be extruded from a bakers pastry bag or which can be deposited by a conventional cookie dropping machine may be deep fried. Also innumerable shapes may be produced.

I achieve these results by depositing th batter upon special plates which are mechanically arranged to travel into and out of the cooking oil.

The receiving surfaces of the plates are coated with polytetrafluoroethylene, a product merchandised under the trade name of Teflon.

Teflon has peculiar anti-sticking properties and is available in sheet form or in liquid form for sprayed and baked finish.

As my apparatus is applicable as to size for both small and large production I mention two of the means by which the batter forms may be placed on the plates: a pastry bag for hand forming the batter and a dropping machine for mechanically depositing the batter.

By hand forming the batter a retail shop baker can devise numerous distinctive shapes whereas the wholesale baker can produce in quantity by arranging a cookie dropping machine in position to deposit the batter directly upon the plates.

My invention includes a cooking oil tank and longitudinally extending guide means which have upper delivery tracks and lower return tracks, the forward end of the guide means extending into the cooking oil tank. Dough supporting means are reciprocated along the guide means by a reciprocating means, the dough supporting means having a dough supporting portion with a dough contacting surface of polytetrafluoroethylene. The dough supporting means rides on the tracks by means of a rider longitudinally spaced from a pivot means which is pivotally connected to the reciprocating means. The forward end of the return track extends further than the forward end of the delivery track to receive the rider as it drops from the delivery track, thus providing a forward transfer means. A rearward transfer means is provided by a trip pivotally connected to the rearward end of the delivery track and extending downwardly toward the return track. The rider pivots this trip upwardly upon rearward movement and upon initial forward movement, the rider is directed upwardly by a forwardly, upwardly slanted runway on the trip; this provides a rearward transfer means.

The invention will be best understood from the following description and annexed drawing in which:

Fig. 1 is a plan view of the entire apparatus.
Fig. 2 is a sectional elevation.
Fig. 3 is a plan view of a traveling plate.
Fig. 4 is a projected side view of Fig. 3.
Fig. 5 is an enlarged view of the track trip which elevates the traveling plates from the lower to the upper track.
Fig. 6 is a projected top view of Fig. 5.

Referring to Fig. 1 it will be seen that I provide endless chains 1 and 2 which are equipped with extended pins 3.

Chains 1 and 2 are driven by sprockets 4 and 5 and pass around sprockets 6 and 7 at the other end.

The upper run of chains 1 and 2 are supported on tracks 8, best shown in Fig. 2.

Sprockets 4 and 5 are mounted on shafts 9 and 10 which are journaled in bearing hubs of frames 11 and 12.

Sprockets 6 and 7 are mounted on shafts 13 and 14 which are also journaled in bearing hubs of frames 11 and 12.

Referring now to Fig. 2 it will be seen that frames 11 and 12 are spaced apart by cross stretchers 15, 16 and 17 also by channel stretcher 18 which also supports gearhead motor 19.

Sprocket 20 mounted on the slow speed shaft of motor 19 drives sprocket 21 by means of chain 22.

Sprocket 21 is secured to cross shaft 23 which is journaled in bearing hubs of frames 11 and 12.

Sprockets 24 and 25 are secured to the outside ends of shaft 23 and, by means of chains 26 and 27, drive sprockets 28 and 29 which are secured to the outside ends of shafts 9 and 10.

For handmade products motor 19 is actuated to stop and start by means of a foot switch, not shown.

For automatic operation with a cookie dropping machine, motor 19 is controlled by means of electrical switches timed by the dropping machine.

Referring to Figs. 3 and 4 it will be seen that traveling plate 30 is a weldment or welded assembly consisting of a frame to which Teflon cover 31 is secured, round rods 32, arms 33 and hubs 34 which are bored to fit on extended pins 3 of chains 1 and 2.

Upper tracks 35 and 36 are provided to support traveling plates 30 on their forward motion into the cooking oil.

As the plates 30 are submerged in the cooking oil they drop from tracks 35 and 36 to lower tracks 37 and 38.

As plates 30 return on tracks 37 and 38 the round rod 32 lift trips 39 which are pivotally mounted at the ends of tracks 35 and 36. After the round rods 32 have passed under the trips 39, the trips drop back into place so that on forward motion the plates 30 are elevated to the upper tracks 35 and 36 by the round rods 32 which ride up the slanted runways formed by the trips 39.

Tracks 35, 36, 37 and 38 are supported on brackets 40 secured to side frames 11 and 12.

The cooking oil tank 41 is conventional in design and may be equipped with pedals and the like for propelling the goods toward the discharge end.

Drip pan 42 is provided for catching drippings from the traveling plates. The pipe at the lower end may discharge into a receptacle.

On one of the traveling plates in Fig. 1 I have shown batter forms.

As the batter is submerged in the hot oil the water contained in the mixture boils violently and in a few seconds the pieces are dislodged from the plate and float to the surface of the oil.

While I have shown the invention as embodied in specific forms, it is to be understood that various changes in details may be made without departing from the scope of the invention, as defined by the appended claims.

I claim:

1. In apparatus of the character described, the combination comprising longitudinally extending guide means including a first guide and a second guide spaced therefrom; dough supporting means including a dough supporting portion, a rider operatively engaging said guide means, and a pivot means spaced longitudinally from said rider; reciprocating means pivotally connected to said pivot means for longitudinally moving said dough supporting means forwardly along said first guide and rearwardly along said second guide; forward transfer means operable at the forward portion of said guide means for transferring said dough supporting means from said first guide to said second guide; and rearward transfer means operable at the rearward portion of said guide means for transferring said dough supporting means from said second guide to said first guide, said forward and said rearward transfer means operable to transfer said dough supporting means without changing the longitudinal relationship of said rider and said pivot means.

2. In apparatus as defined in claim 1 wherein said dough supporting portion has a dough contacting surface of polytetrafluoroethylene.

3. In apparatus of the character described, the combination comprising longitudinally extending guide means including a first guide and a second guide spaced therefrom; dough supporting means including a forward dough supporting portion, an intermediate rider operatively engaging said guide means, and a rearward pivot means; reciprocating means pivotally connected to said pivot means for moving said dough supporting means forwardly along said first guide and rearwardly along said second guide; forward transfer means operable at the forward portion of said guide means for transferring said dough supporting means from said first guide to said second guide; and rearward transfer means including a trip having a runway and pivoted to the rearward end of said first guide and extending toward said second guide, said rearward transfer means being operable at the rearward portion of said guide means for transferring said dough supporting means from said second guide to said first guide, said forward and said rearward transfer means operable to transfer said dough supporting means without changing the longitudinal relationship of said rider and said pivot means.

4. In apparatus as defined in claim 3 wherein said dough supporting portion has a dough contacting surface of polytetrafluoroethylene.

5. In an oil tank of the character described, the combination comprising a cooking oil tank; longitudinally extending guide means including an upper delivery track and a lower return track, the forward end of said guide means extending into said cooking oil tank; dough supporting means including a dough supporting portion having a dough contacting surface of polytetrafluoroethylene which facilitates complete removal of dough from the dough supporting means while in the cooking oil tank, said dough supporting means including a rider operatively engaging said guide means and a pivot means longitudinally spaced from said rider; reciprocating means pivotally connected to said pivot means for moving said dough supporting means forwardly along said delivery track and rearwardly along said return track, said return track having its forward end positioned forwardly of the forward end of said delivery track to receive said rider upon dropping from said delivery track, a trip pivotally hinged to the rearward end of said delivery track and extending downwardly toward said return track to enable upward pivoting thereof by said rider as it moves rearwardly along said lower return track, said trip having a runway extending upwardly and forwardly from said return track to said delivery track, said runway receiving said rider upon forward movement and directing said rider to said upper delivery track without changing the longitudinal relationship of said rider and said pivot means.

References Cited in the file of this patent

UNITED STATES PATENTS

| | | |
|---|---|---|
| 1,648,330 | Smith | Nov. 8, 1927 |
| 1,926,313 | Smith | Sept. 12, 1933 |
| 2,190,432 | McKee | Feb. 13, 1940 |
| 2,462,242 | Webb et al. | Feb. 22, 1949 |
| 2,060,510 | Collings | Aug. 12, 1952 |
| 2,684,177 | Kennedy | July 20, 1954 |